T. A. C. BOTH.
MECHANICAL MOVEMENT AND ELECTRIC LIGHT SOCKET.
APPLICATION FILED AUG. 2, 1911.
1,014,443.
Patented Jan. 9, 1912.
3 SHEETS—SHEET 1.
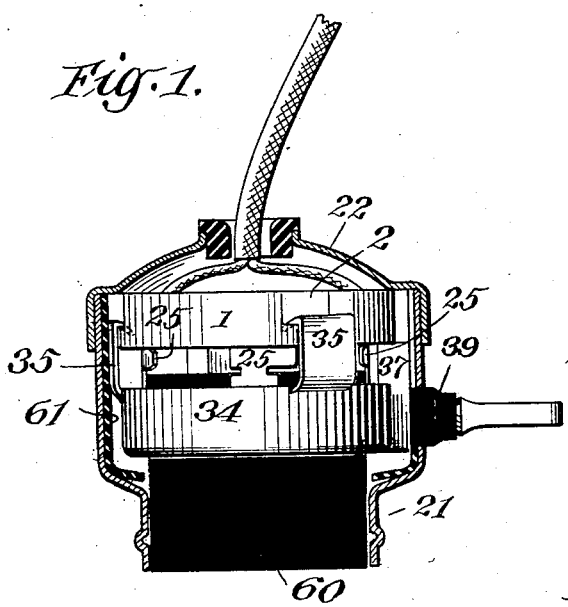
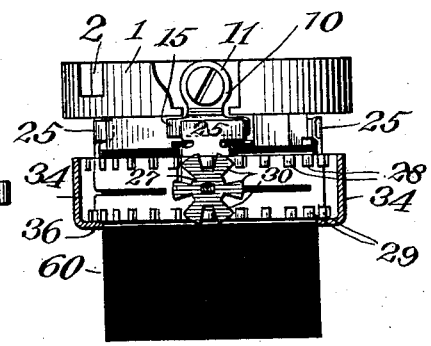
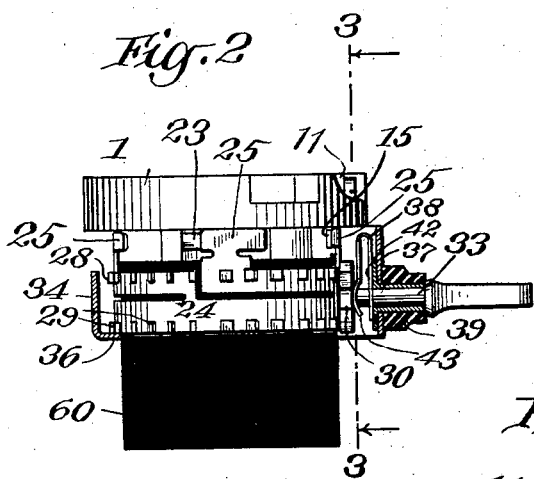
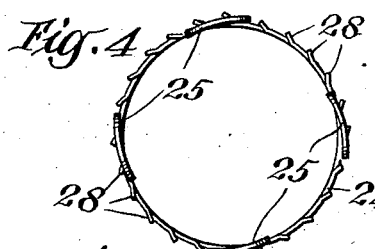
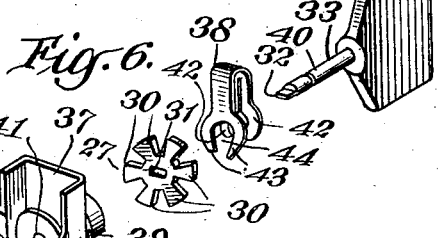
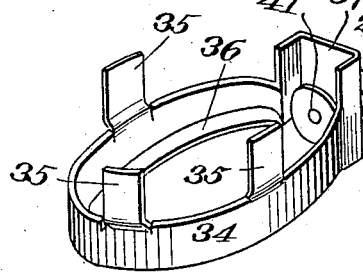
WITNESSES
INVENTOR
Tonjes A. C. Both
BY
Alan M. Johnson
ATTORNEY T. A. C. BOTH.
MECHANICAL MOVEMENT AND ELECTRIC LIGHT SOCKET.
APPLICATION FILED AUG. 2, 1911.
1,014,443.
Patented Jan. 9, 1912.
3 SHEETS—SHEET 2.
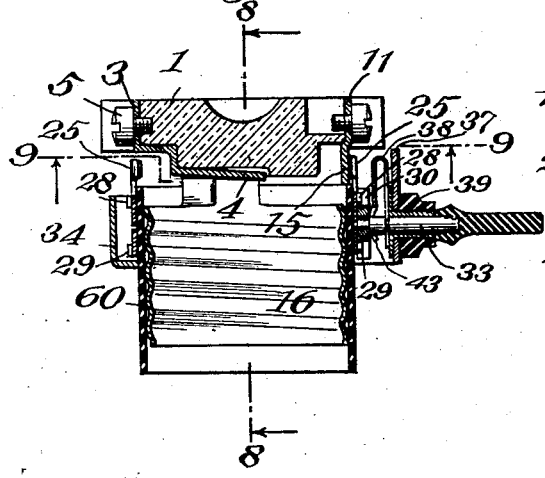
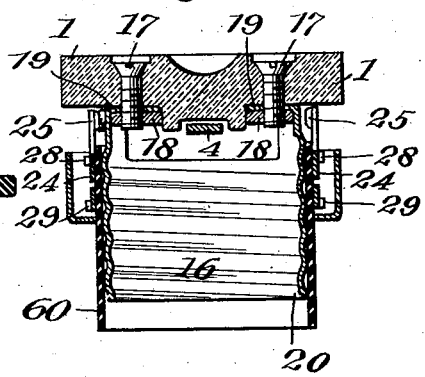
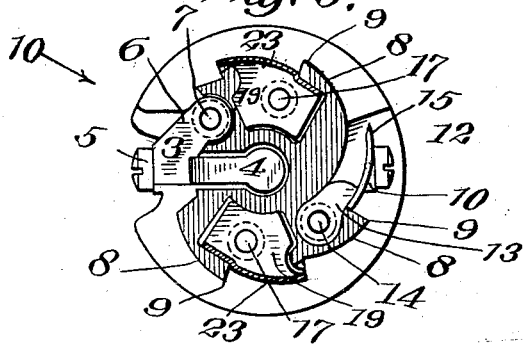
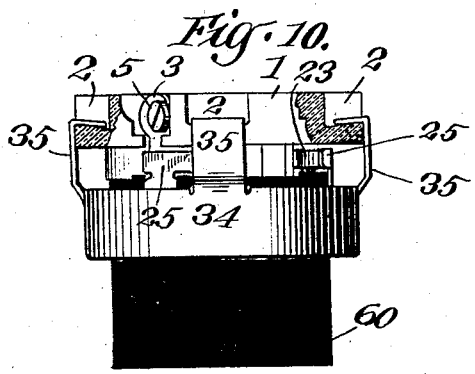
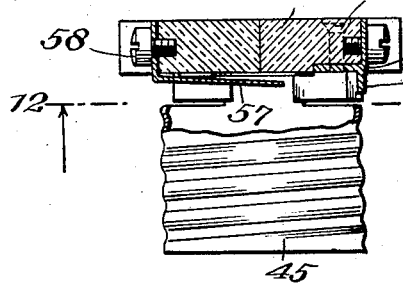
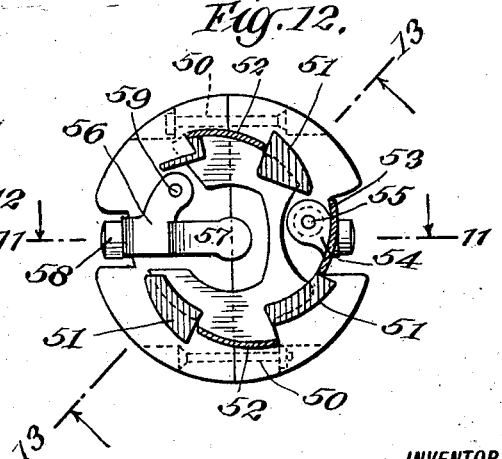
WITNESSES
Rose Menk
Hattie Bayles
INVENTOR
Tonjes A. C. Both
BY
Alan M. Johnson
ATTORNEY T. A. C. BOTH.
MECHANICAL MOVEMENT AND ELECTRIC LIGHT SOCKET.
APPLICATION FILED AUG. 2, 1911.
1,014,443.
Patented Jan. 9, 1912.
3 SHEETS—SHEET 3.
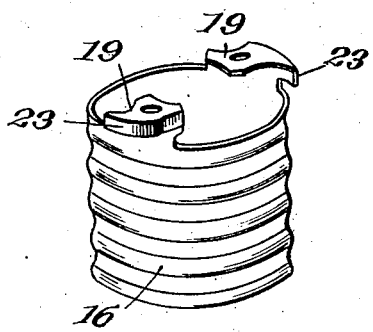
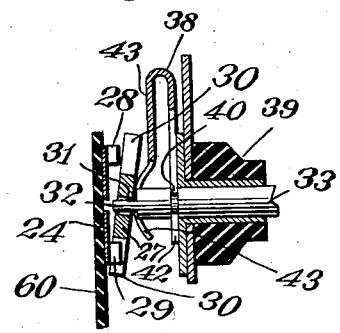
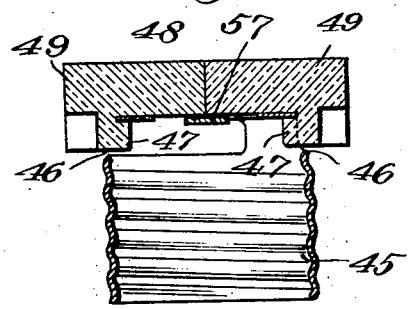
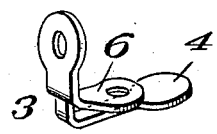
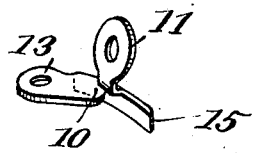
WITNESSES
R. Menk
Hattie Bayles
INVENTOR
Tonjes A. C. Both
BY
Alan M. Johnson
ATTORNEY

UNITED STATES PATENT OFFICE.

TONJES AUGUST CARL BOTH, OF NEW YORK, N. Y., ASSIGNOR TO IDA S. ROSENHEIM, OF NEW YORK, N. Y.

MECHANICAL MOVEMENT AND ELECTRIC-LIGHT SOCKET.

1,014,443. Specification of Letters Patent. Patented Jan. 9, 1912.

Application filed August 2, 1911. Serial No. 641,926.

*To all whom it may concern:*

Be it known that I, TONJES AUGUST CARL BOTH, a citizen of the United States, and a resident of New York, in the county of New York and State of New York, have invented certain new and useful Improvements in Mechanical Movements and Electric-Light Sockets, of which the following is a specification, taken in connection with the accompanying drawings, which form a part of the same.

My invention relates to a mechanical movement adapted for universal application. I have shown it simply by way of example, as the operating mechanism in an electric light socket wherein it will make a quick make as well as a quick break between the electrical contacts of the socket, on the rotation, in either direction, of the driving member, the driven member continuing to rotate always in one direction regardless of the direction of rotation of the driving member. While I have shown a key socket by way of example, it is, of course, to be understood that my invention is not to be limited to such a socket.

My invention further relates to electric light sockets and broadly to a short or shallow socket whereby the amount of metal needed for the casing is reduced to the minimum, as well as a corresponding saving of metal being made in any husks with which the electric light socket may be used. Such a short or shallow electric light socket is therefore cheaper to manufacture and being much smaller is less obtrusive and more pleasing to the eye, either when used alone or as a part of a cluster or other more or less elaborate electric installation.

My invention further relates broadly to any switch mechanism in an electric light socket in which either the driven member or the driving member is mounted on the exterior of the lamp holding member and substantially between the top and bottom of said member, meaning by that term the ordinary screw shell terminal, or any other holding member of any configuration for holding any consuming device, whether a lamp or not being immaterial.

My invention further relates broadly to an electric light socket switch mechanism in which both the driving and driven members are mounted substantially between the top and bottom of the lamp holding member and on the exterior of said lamp holding member.

My invention further relates broadly to an electric light socket in which the switch mechanism is located between the second lamp terminal and the lamp entrance to the lamp holding member which, for example, is here described as the first lamp terminal.

My invention further relates broadly to an electric light socket having a lamp holding member and a surrounding casing or shell, with a switch mechanism mounted between the lamp holding member and said surrounding casing or shell.

My invention further relates to certain details of construction both as to the mechanical movement and to the electric light socket which will be more fully hereinafter described in the specification and particularly pointed out in the claims.

In the accompanying drawings showing illustrative embodiments of my invention, and in which the same reference numerals refer to the similar parts in the several figures,—Figure 1 is a side elevation of the electric light socket, the casing and cap being shown in vertical section; Fig. 2 is a side elevation of the electric light socket, a portion of the mechanism being shown in section for the purpose of clearer illustration; Fig. 3 is a vertical section substantially on the line 3—3 of Fig. 2, looking in the direction of the arrows; Fig. 4 is a plan view of the driven member; Fig. 5 is a side elevation of the driven member; Fig. 6 is a perspective view of the housing, the driving member, the resilient member and the key; Fig. 7 is a vertical section through the electric light socket; Fig. 8 is a vertical section through the socket on the line 8—8 of Fig. 7, looking in the direction of the arrows; Fig. 9 is a horizontal section substantially on the line 9—9 of Fig. 7, looking in the direction of the arrows; Fig. 10 is a side elevation of the socket, a part being broken away for the purpose of clearer illustration; Fig. 11 is a side elevation partly in vertical section of a modification; Fig. 12 is a horizontal section substantially on the line 12—12 of Fig. 11 looking in the direction of the arrows; Fig. 13 is a vertical section substantially on the line 13—13 of Fig. 12 looking in the direction of the arrows; Fig. 14 is a perspective view of one form of a holder for a consuming device which is shown by way of example as a screw shell; Fig. 15 is a detail sectional view on an enlarged scale of a portion of the mechanism; Fig. 16 is a perspective view of the center contact; and Fig. 17 is a perspective view of the side contact.

In the illustrative embodiments of my invention shown in the drawings, 1 is an insulating base formed of any suitable material but preferably of porcelain. This base is formed as shallow as possible and is preferably provided with one or more recesses 2, 2 and carries the contact plate 3 to which is secured in any suitable manner a center contact 4, a binding screw 5 (Fig. 9) and the arm 6 with which coöperates the screw 7 holding it in its proper position on the insulating base 1. The lower surface of the insulating base is provided with a plurality of inclined surfaces or fixed non-conducting ratchets 8 terminating abruptly in the shoulders 9. Located adjacent to one of the inclined or fixed ratchet surfaces 8 I mount the side contact plate 10, Figs. 3, 9 and 17 having an ear 11 for the reception of the binding screw 12, an arm 13 for the reception of the locking screw 14, Fig. 9, and the inclined conducting ratchet surface 15. To this shallow insulating base member 1, I secure in any suitable manner a holder for a consuming device. By way of example I have shown this holder in the form of a screw shell 16, Figs. 7 and 14, but it is to be distinctly understood that it may be given any suitable shape or configuration to hold any form of consuming device, though the consuming device would ordinarily be a lamp or similar device, or a plug connected to any form of consuming device. This holder for a consuming device will be hereinafter referred to as a lamp holder, though it is to be understood that this term is used throughout the specification and claims without limiting the form of consuming device or the shape or configuration of the holder, which simply for purposes of illustration is shown as a screw shell 16. The holder, whatever its form may be, is secured in any suitable manner to the insulating base 1. In one form of my invention this lamp holder is secured to the insulating base by means of the screws 17, 17 passing through the insulating base 1 and coöperating with the nuts 18, 18, Fig. 8, a portion 19, 19 or a member secured to the lamp holder being held between the insulating base and the nuts 18, 18.

One portion of my invention consists broadly in any switch mechanism for turning on and off the electric current having the driven member mounted between the mouth 20 and substantially the top 19 of the lamp holder whether such lamp holder be a screw shell 16 or not being immaterial. By such an arrangement I avoid mounting the switch mechanism between the top of the lamp holder, or the center contact, 4, and the insulating base 1, and am thereby enabled to materially reduce the length not only of the electric light socket, but also of the shell 21 and the cap 22, thereby forming a very shallow electric light socket, and one which is very pleasing to the eye, besides forming a very cheap socket, due to the fact that less metal has to be used in the shell and cap 21 and 22, respectively, as well as less metal in any husk which may be used to surround the socket. My invention also includes placing both the driven as well as the driving member between the top and bottom of the holder, as well as all parts of the switch mechanism. Various such switch mechanisms may be used, all of which would come within the terms of my invention. I have shown by way of example the lamp holding member 16 being provided with fixed conducting ratchets 23, 23 which when the lamp holder 16 is secured to the insulating base 1 alternate with the fixed insulating ratchets 8, 8 on the insulating base 1 as more clearly shown for example in Fig. 9.

Mounted on the exterior of the lamp holder 16 and between its mouth and the top of the lamp holder I mount the driven member 24 of my mechanical movement. This driven member may be given various forms. I preferably form it as a ring shaped member provided with a plurality of spring contact members 25, 25, four being shown in the drawing Fig. 4, each contact member being inclined to coöperate with the conducting ratchets 23, 23 formed upon or carried by the lamp holder 16, and the conducting side ratchet contact 15 and with the non-conducting ratchets 8, 8 on the insulating base 1. To permit the spring contact member 25 to have freer movement on the different conducting or non-conducting ratchets above referred to, I may in some cases, though not necessarily, form a series of angular slots 26 in the driven member, Fig. 5. This driven member 24 is always rotated in one direction regardless of the direction of rotation of the driving member which I have shown by way of example as a pawl 27. One means for accomplishing this result and which I have shown simply to illustrate one embodiment of my invention is to place ratchet teeth 28 on the upper portion of the driven member and similar ratchet teeth 29 on the lower portion of the driven member 24, the inclined surfaces of both ratchet teeth extend in the same direction.

The driving member 27 is provided with a plurality of arms 30, 30 to engage with the respective ratchet teeth 28 and 29 upon the driven member 24. Any suitable means are provided for rotating this driving member 27, the construction of the driving and driven members being such that the rotation of the driving member 27, in either direction of rotation, will always drive the driven member 24 in one direction so as to insure the spring contact members 25, 25 mounted upon it making either a quick make or a quick break of the electric current upon the rotation, in either direction, of the driving member 27.
One means for driving the driving member, which I have found efficacious in use is to provide it with an angular bearing 31 which coöperates with the angular surface 32 upon the key 33. The bearing 31 is larger than necessary to snugly fit the angular surface 32. By so mounting the driving member upon the key 33 I permit a teetering motion between the driving member 27 and the key 33 as more clearly appears on an enlarged scale in Fig. 15.

To insure the driven member 24 retaining its proper position upon the exterior of the lamp socket 16 so that the spring contact members 25, 25 will always be in their proper position to coöperate with the conducting and non-conducting ratchets 23, 23, 15 and 8, respectively, I use any retaining means preferably a housing 34 having fingers 35, 35 and an inturned flange 36. This housing surrounds the driven member 24 which rests upon the inturned flange 36. The housing is secured to the insulating base 1 simply by bending down the ends of the fingers 35, 35 so that they rest in the recesses 2, 2 in the insulating base. This housing 34 is preferably provided with an angular portion 37 for the reception of the driving member 27 and the resilient member 38. I also preferably, though not necessarily provide this angular portion of the housing with a hollow bushing 39 through which passes the key 33 which is preferably provided with an annular groove 40. The key 33 is inserted through the opening 41 in the bushing 39 and is held from accidental displacement or withdrawal by means of the spring arms 42, 42 of the resilient member 38 snapping into the annular groove 40. The other spring arms 43, 43 of the resilient member 38 are cut away at 44 and do not interfere with the free rotation, in either direction, of the key 33; they, however, yieldingly press the driving member 27 against the ratchet teeth 28 and 29 on the driven member 24, as clearly shown in Figs. 2 and 15.

From the mechanism so far described it will be clear that rotation of the driving member 27, preferably by means of the key 33, will cause some one of its arms 30, 30 to engage with the ratchet teeth 29, 29 while escaping the other teeth 28, 28, and that the rotation of the driving member 27 in the opposite direction, will cause the arms 30 to disengage with the ratchet teeth 29 and engage the teeth 28, but in doing so the driven member 24, upon which the ratchet teeth are mounted, will always move in the same direction to make either a quick make or a quick break of the current in the socket.

Instead of securing the lamp holder 16 to the insulating base by means of the screws 17, 17 I may, in some cases, form a lamp holder 45, Figs. 11, 12 and 13, with cut out portions 46 to coöperate with lugs 47 upon the split insulating base 48 formed preferably of two sections 49, 49 secured together by means of the screws 50, 50 Fig. 12. It is obvious that when the two sections 49, 49 of the insulating base 48 are brought into position so that the lugs 47 take into the recesses 46 that the lamp holder 45, as well as the sections of the insulating base, will be all held together by the screws 50, 50. I provide this form of insulating base 48 with insulating ratchets 51, 51 which lie between the conducting ratches 52, 52 which are carried by the lamp holding member 45 preferably, but not necessarily, by being formed as a part of it. Between two of the non-conducting ratchets 51, 51 I mount the conducting ratchet 53 carried by the binding plate 54 which is held to one of the sections 49 of the insulating base by the screw 55. Between one of the non-conducting ratchets 51 and one of the conducting ratchets 52 carried by the shell I mount the binding plate 56, carrying a center contact 57 and binding screw 58, the binding plate being secured to one of the insulating base sections in any suitable manner, such as by the screw 59, Fig. 12.

The casing 21 is preferably lined with insulation 61. The holder for the consuming device is preferably surrounded by insulation 60 which acts as an insulation between the holding member, as for example, the screw shell 16, and the switch mechanism when the current is turned off, and also acts as an insulation between the screw shell 16 and the shell or casing 21, Fig. 1.

Having thus described this invention in connection with several illustrative embodiments thereof to the details of which I do not desire to be limited, what is claimed as new and what it is desired to secure by Letters Patent is set forth in the appended claims.

I claim—

1. In a mechanical movement, the combination of a rotary driven member provided with different sets of ratchet teeth and a driving member adapted to coöperate with the different sets of ratchet teeth to drive the driven member in the same direction regardless of the direction of rotation of the driving member.

2. In a mechanical movement, the combination of a rotary ing-shaped driven member provided with different sets of ratchets on its periphery and a driving member adapted to coöperate with the different sets of ratchet teeth to drive the driven member in the same direction regardless of the direction of rotation of the driving member.

3. In a mechanical movement, the combination of a rotary driven member, a rotary driving member, means adapted to rotate the driven member always in the same direction regardless of the direction of rotation of the driving member, a member for actuating the driving member, and a teetering connection between the actuating member and the driving member.

4. In a mechanical movement, the combination of a rotary driven member, a rotary driving member, means adapted to rotate the driven member always in the same direction regardless of the direction of rotation of the driving member, a member for actuating the driving member, and a resilient member adapted to normally move the driving member toward the driven member.

5. In a mechanical movement, the combination of a rotary driven member and a rotary driving member each having coöperating engaging surfaces adapted to rotate the driven member always in one direction regardless of the direction of rotation of the driving member, and a resilient member adapted to normally move the driving member toward the driven member.

6. In a mechanical movement, the combination of a rotary driven member provided with different sets of ratchet teeth, a driving member adapted to coöperate with the different sets of ratchet teeth to drive the driven member in the same direction regardless of the direction of rotation of the driving member, and a resilient member adapted to normally move the driving member toward the ratchet teeth of the driven member.

7. In a mechanical movement, the combination of a rotary ring shaped driven member provided with different sets of ratchet teeth on its periphery, and a driving member adapted to coöperate with the different sets of ratchet teeth to drive the driven member in the same direction regardless of the direction of rotation of the driving member, and a resilient member adapted to normally move the driving member toward the ratchet teeth of the ring shaped driven member.

8. In an electric light socket, including a holder for a consuming device, the combination of a rotatable driven contact member mounted substantially between the top and bottom of the holder, a driving member for driving the driven contact member, and means insuring the rotation of the driven member in one direction regardless of the direction of rotation of the driving member.

9. In an electric light socket, the combination of a holder for a consuming device, a ring shaped driven contact member mounted on the exterior of the holder and substantially between the bottom and top of said holder, a driving member, and means to drive the driven contact member in one direction regardless of the direction of rotation of the driving member.

10. In an electric light socket, the combination of a lamp holder, a rotatable contact member provided with two sets of engaging surfaces, said rotatable contact driven member being mounted between the top and bottom of the holder, and a driving member adapted to engage with the engaging surfaces of the driven member.

11. In an electric light socket, the combination of a lamp holder, a rotatable ring shaped contact member provided with two sets of ratchet teeth, said rotatable ring shaped contact member being mounted substantially between the top and bottom of the holder, and a driving member adapted to engage with the ratchet teeth.

12. In an electric light socket, the combination of a lamp holder, a rotatable ring shaped contact member provided with two sets of ratchet teeth, said rotatable ring shaped contact member being mounted substantially between the top and bottom of the holder, a driving member adapted to engage with the ratchet teeth, and a resilient member to normally press the driving member into engagement with the ratchet teeth.

13. In electric light sockets, the combination of a lamp holder, a rotatable contact member mounted substantially between the top and bottom of the holder and provided with two sets of ratchet teeth, a driving member adapted to engage with the ratchet teeth, a key and coöperating surfaces between the driving member and key to permit a teetering motion between the two.

14. In electric light sockets, the combination of a lamp holder, a rotatable contact member mounted between the top and bottom of the holder and provided with two sets of ratchet teeth, a driving member adapted to engage with the ratchet teeth, a key provided with a locking groove, coöperating surfaces between the driving member and key permitting a teetering motion between the two, and a resilient member provided with two spring arms, one spring arm to engage with the locking groove of the key to prevent its accidental removal, and the other spring arm to yieldingly press the driving member into engagement with the ratchet teeth of the driven member.

15. In an electric light socket, the combination of an insulating base, fixed insulating ratchet surfaces carried by the insulating base, a holder for a consuming device, conducting fixed ratchet surfaces connected with the holder, a rotating conducting driven member adapted to coöperate with said fixed conducting and insulating ratchet surfaces, means to supply current to the rotating conducting driven member, and a driving member.

16. In an electric light socket, the combination of an insulating base, fixed insulating ratchet surfaces carried by the insulating base, a holder for a consuming device, conducting fixed ratchet surfaces connected with the holder, a rotating conducting driven member adapted to coöperate with said fixed conducting and insulating ratchet surfaces, said driven member being mounted substantially between the top and bottom of the holder, and a driving member.

17. In an electric light socket, the combination of an insulating base, fixed insulating ratchet surfaces carried by the insulating base, a holder for a consuming device, conducting fixed ratchet surfaces connected with the holder, a rotating conducting driven member adapted to coöperate with said fixed conducting and insulating ratchet surfaces, means to supply current to the rotating conducting driven member, a driving member, and means insuring the rotation of the driven member in one direction regardless of the direction of rotation of the driving member.

18. In an electric light socket, the combination of an insulating base, fixed insulating ratchet surfaces carried by the insulating base, a holder for a consuming device, conducting fixed ratchet surfaces connected with the holder, a rotating conducting driven member adapted to coöperate with said fixed conducting and insulating ratchet surfaces, means to supply current to the rotating conducting driven member, a driving member, both the driving and driven members being mounted substantially between the top and bottom of the holder.

19. In an electric light socket, the combination of an insulating base formed of a plurality of parts, lugs carried by the base, a holder provided with cut out portions to receive the lugs of the base, and means to secure the sections of the base together and at the same time to secure the holder to the base.

20. In an electric light socket, the combination of a holder for a consuming device and rotatable switch mechanism mounted on the outside of the holder and substantially between the top and bottom of the holder, and a housing to coöperate with the rotatable switch mechanism.

21. In an electric light socket, the combination of a lamp holder and switch mechanism mounted substantially between the top and bottom of the lamp holder and including a rotary contact member mounted on the exterior of the lamp holder, means to operate it, and a housing to surround and coöperate with the rotary contact member.

22. In an electric light socket, the combination of an insulating base, insulating ratchet surfaces carried by the base, a lamp holder provided with conducting ratchet surfaces, a contact plate provided with a fixed ratchet conducting surface, a ring shaped rotary driving conducting member mounted substantially between the top and bottom of the lamp holder and adapted to coöperate with the conducting and non-conducting ratchets, a driving member adapted to actuate the driven member, and a housing.

23. In an electric light socket, the combination of an insulating base provided with recesses, insulating ratchet surfaces carried by the base, a lamp holder provided with conducting ratchet surfaces, a contact plate provided with a fixed ratchet conducting surface, a ring shaped rotary driven conducting member mounted substantially between the top and bottom of the lamp holder and adapted to coöperate with the conducting and non-conducting ratchets, a driving member adapted to actuate the driven member, and a housing provided with fingers to coöperate with the recesses in the insulating base.

24. In an electric light socket, the combination of a holder, an insulating collar surrounding the holder, a switch mechanism, a shell or casing surrounding the socket, said insulating collar serving to insulate the switch mechanism and also insulate the holder from the shell or casing.

25. An article of manufacture for an electric light socket comprising a holder for a consuming device provided with conducting ratchets.

26. An article of manufacture for an electric light socket comprising a holder for a consuming device provided with integral conducting ratchets.

27. An article of manufacture for an electric light socket comprising a screw shell provided with conducting ratchets.

28. An article of manufacture for an electric light socket comprising a screw shell provided with integral conducting ratchets.

29. An article of manufacture for an electric light socket comprising a screw shell provided with integral conducting ratchets extending beyond the outer periphery of the screw shell.

30. In an electric light socket the combination of a conducting holder for a consuming device, a second terminal, an outer casing or shell, and a switch mechanism including a rotatable ring shaped driven member located between the conducting holder and the outer casing or shell.

31. In an electric light socket the combination of a screw shell, a second terminal, an outer casing or shell, and a switch mechanism including a rotatable ring shaped driven member located between the conducting holder and the outer casing or shell.

32. In an electric light socket, the combination of a screw shell, a second terminal, an outer casing or shell, and a switch mechanism including a rotatable ring shaped driven member located between the conducting holder and the outer casing or shell and between the second terminal and the lamp entrance to the screw shell.

TONJES AUGUST CARL BOTH.

Witnesses:
LESTER H. APPEL,
LEON STRAUSS.

Copies of this patent may be obtained for five cents each, by addressing the "Commissioner of Patents, Washington, D. C."